United States Patent [19]

May

[11] Patent Number: 4,679,086
[45] Date of Patent: Jul. 7, 1987

[54] MOTION SENSITIVE FRAME INTEGRATION

[75] Inventor: Roger A. May, Longwood, Fla.

[73] Assignee: The United States of America as represented by the Secretary of the Air Force, Washington, D.C.

[21] Appl. No.: 831,894

[22] Filed: Feb. 24, 1986

[51] Int. Cl.[4] .......................................... H04N 5/213
[52] U.S. Cl. .................... 358/167; 358/105; 358/136
[58] Field of Search ............... 358/167, 105, 136, 133, 358/135, 177, 138

[56] References Cited

U.S. PATENT DOCUMENTS

| | | | |
|---|---|---|---|
| 4,051,530 | 9/1977 | Kuroda et al. | 358/136 |
| 4,107,736 | 8/1978 | Lowry et al. | 358/167 X |
| 4,240,106 | 12/1980 | Michael et al. | 358/167 X |
| 4,240,109 | 12/1980 | Michael et al. | 358/105 |
| 4,242,705 | 12/1980 | Ebihara | 358/167 |
| 4,288,815 | 9/1981 | Miles | 358/105 |
| 4,296,436 | 10/1981 | Achiha | 358/105 X |
| 4,363,103 | 12/1982 | Richard et al. | 364/515 |
| 4,437,119 | 3/1984 | Matsumoto et al. | 358/136 |
| 4,464,789 | 8/1984 | Sternberg | 382/48 |
| 4,485,403 | 11/1984 | Illetschko | 358/167 |
| 4,488,174 | 12/1984 | Mitchell et al. | 358/136 |
| 4,494,140 | 1/1985 | Michael | 358/105 |

Primary Examiner—Michael A. Masinick
Assistant Examiner—E. Anne Tota
Attorney, Agent, or Firm—William G. Auton; Donald J. Singer

[57] ABSTRACT

Noise smoothing of imaging data is performed using frame integration, by averaging pixels over time instead of space, without resulting in a smear of moving objects by: sensing image motion; and enabling frame integration on only stationary scene pixels. Image motion is sensed by: producing a differencing signal which indicates the difference between new image data and frame integrated data; and comparing the differencing signal with a threshold signal. When the threshold signal has a value which approximately equals expected image noise, then the image data processed by a particular pixel may be deemed non-moving when the difference signal is less than the threshold signal, and the image data may be deemed to depict moving objects otherwise. Finally, image data is conducted unprocessed to the display for moving scene pixels, while frame integrated image data is conducted to the display for stationary scene pixels.

6 Claims, 2 Drawing Figures

MOTION SENSITIVE FRAME INTEGRATION

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to video signal processing systems and specifically to an image noise suppression system which produces a filtered image by averaging each pixel of the image over time.

The task of image noise suppression is alleviated, to some extent, by the prior art techniques given in the following U.S. patents, which are incorporated herein by reference:

U.S. Pat. No. 4,051,530 issued to Kuroda on 27 September 1977;
U.S. Pat. No. 4,363,103 issued to Richard on 7 December 1982;
U.S. Pat. No. 4,437,119 issued to Matsumoto on 13 March 1984;
U.S. Pat. No. 4,464,789 issued to Sternberg on 7 August 1984;
U.S. Pat. No. 4,488,174 issued to Mitchell on 11 December 1984; and
U.S. Pat. No. 4,494,140 issued to Michael on 15 January 1985.

Common image noise suppression techniques involve some form of spatial filtering. This implies deriving a filtered image by taking each pixel position and replacing it with an average of the neighborhood around the pixel. Many more sophisticated techniques than mere averaging are abundant in the literature. A disadvantage of the averaging technique is that image resolution is reduced by averaging a pixel with its neighbors.

Frame integration is a noise suppression technique that does not have this disadvantage if the image is stationary. Here, the noise filtered image is obtained by averaging the pixels over time instead of space. A given pixel is averaged with the data at that position obtained during the previous frames. If the image is stationary or changes slowly, then frame integration filters noise and has no effect on scene content. A simple recursive filter implementation of frame integration results in noise reduction by a factor of $1/(1+n)^{\frac{1}{2}}$. Where n = the number of frames of integration.

The technique of providing noise smoothing of imaging data by averaging pixels over time instead of space is subject to a particular drawback. In normal use the imaging data changes rapidly when the video signals depict moving objects. When the classical frame integration approach, described above, is applied for noise suppression, moving objects tend to smear by the process of averaging the pixels over time.

In view of the foregoing discussion, it is apparent that there currently exists the need for a noise filtering imaging system which allows the use of frame integration without reducing the high spatial frequency information within the imaging signals. The present invention is intended to satisfy that need.

SUMMARY OF THE INVENTION

The present invention is an image noise suppression system which provides noise smoothing of imaging data by performing frame integration which is controlled so that moving objects are not smeared by a process that normally averages the pixels across tixe.

A conventional frame integration system contains two multipliers, an adding unit, and a frame memory. This system processes imaging data so that for every pixel position, the data stored in the frame memory (and displayed) is one half the new data plus one half the previously stored data. This reduces noise by averaging frame to frame but moving scenes smear.

The present invention, in addition to conventional frame integration, senses image motion using: a threshold, an absolute value unit, a differencer and a comparator. The threshold is a signal generator which outputs a signal with a value near that expected of the image noise. The differencer produces a difference signal by subtracting the frame integrated signal from new image data. The absolute value unit receives the difference signal and outputs its absolute value. The comparator makes the determination as to whether each pixel is processing image data for moving or non-moving objects by comparing the absolute value of the difference signal with the threshold signal. If the difference signal is less than the threshold signal, then the image data processed by that particular pixel is deemed non-moving, and the multiplexer conveys the frame integrated result to the frame memory to be stored and displayed. If the difference signal is greater than or equal to the threshold signal, the image data is deemed moving, and the new image data is stored and displayed.

As described above, the multiplexer selects either: the frame integrated result (for non-moving objects) or new non-integrated data (for moving objects) for input into the frame memory and display. The result of this noise suppression system is that frame integration is performed only on stationary scene pixels; and integration is inhibited for pixels which process image data depicting moving objects.

The process of the present invention entails sensing image motion, and enabling frame integration on only stationary scene pixels. Integration is inhibited for pixels which process image data depicting moving objects. The image noise suppression is performed without smearing image data depicting moving objects.

It is a principal object of the present invention to provide a noise filtering image system without reducing high spatial frequency information.

It is another object of the present invention to perform image data noise suppression using frame integration for stationary objects.

It is another object of the present invention to inhibit frame integration for pixels which process data depicting moving objects to avoid smearing of images.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is an image noise suppression apparatus and technique which performs frame integration on pixels depicting stationary objects, and inhibits frame integration on pixels depicting moving objects to prevent image smearing.

Figure 1:
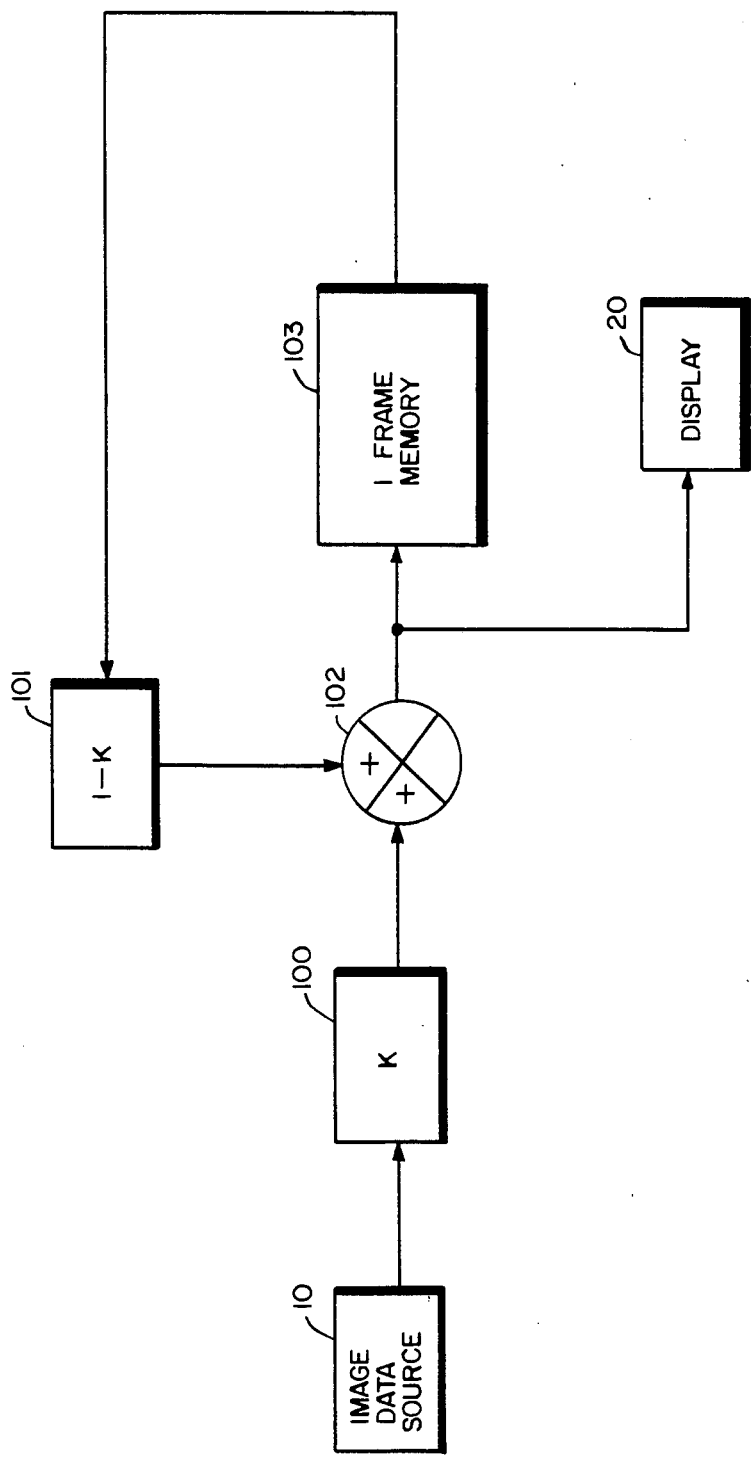
FIG. 1 is a schematic depicting a prior art frame integration system.

The reader's attention is now directed to FIG. 1, which is a schematic depicting a prior art frame integration system. As illustrated, a conventional frame integration system processes image data for display using: two multipliers 100 and 101, an adding unit 102, and a frame memory 103. The first multiplier 100 receives imaging data and produces an output signal by multiplying by a coefficient K. Coefficient K is defined as:

$$K = \frac{1}{1+Y} \text{ where } Y = \text{number of frames of integration}$$

then for $Y = 1$ frame of integration $$K = \frac{1}{2}$$

$$1 - K = \frac{1}{2}$$

and for every pixel position the data stored in memory is ½ of the new data plus ½ of the previously stored data. After a long time (1 second for instance), what is stored in memory and what is displayed is:

$$\text{Displayed Data} = \frac{1}{2} X_{new} + \frac{1}{4} X_{1FO} + \frac{1}{8} X_{2FO} + \frac{1}{16} X_{3FO} + \frac{1}{32} X_{4FO} + \ldots$$

where
- $X_{new}$ = latest frame data;
- $X_{1FO}$ = frame data 1 frame ago;
- $X_{2FO}$ = frame data 2 frames ago; and
- $X_{3FO}$ = frame data 3 frames ago, etc.

The benefits of this technique are that noise is reduced by averaging the data from frame to frame. However, averaging the signal causes a moving scene to smear.

Figure 2:
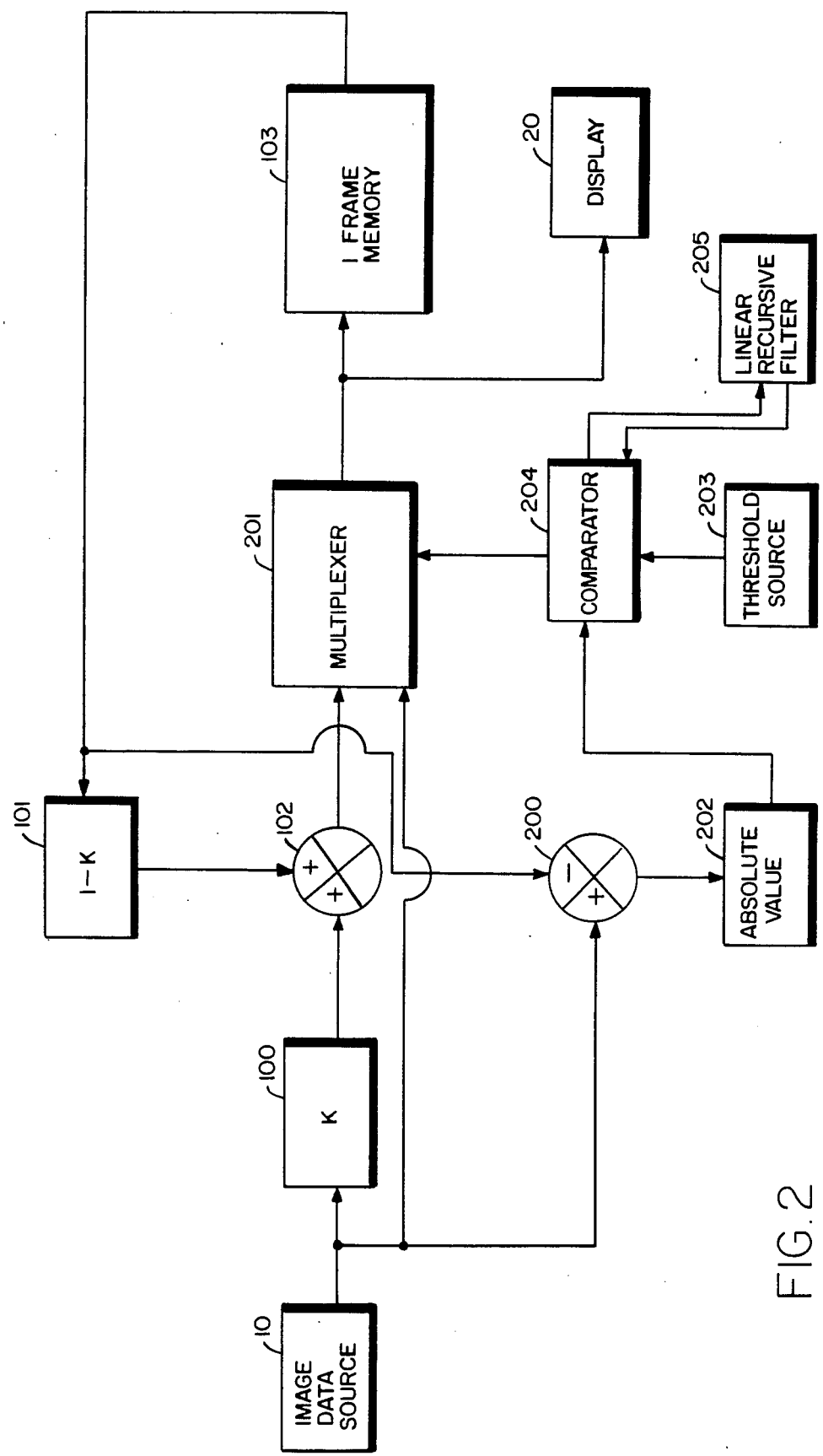
FIG. 2 is a schematic of the noise suppression system of the present invention.

FIG. 2 is a schematic depicting the motion sensitive frame integration system of the present invention. This system contains the elements of the conventional frame integration system 100–103, described above, plus an enabling subsystem 200–204 which enables frame integration for pixels depicting stationary objects, and inhibits frame integration for pixels depicting moving objects.

This enabling subsystem senses image motion using a differencer 200, a multiplexer 201, an absolute value unit 202, a threshold 203, and a comparator 204. The threshold 203 is a signal generator which outputs a signal with an amplitude value near that expected of the image noise. In systems that have automatic gain control (AGC), the threshold should be varied to correspond to the noise at the selected gain setting. For fixed gain systems, the noise should be fairly constant and no threshold variation is required.

The differencer 200 produces a difference signal by receiving and subtracting frame integrated data from the frame memory unit 103 with new image data. This difference signal is received by the absolute value unit 202 which outputs the absolute value of this difference signal to the comparator 204 comparison with the threshold signal from the threshold 203.

The comparator 204 makes the determination as to whether each pixel is processing image data for moving or non-moving objects by comparing the absolute value of the difference signal with the threshold signal. If the absolute value of the difference signal is less than the threshold signal, then the image data processed for that particular pixel is deemed non-moving, and the multiplexer 201 conducts the frame integrated signal from the adding unit 102 into the frame memory 103 to be stored and displayed. If the absolute value of the difference signal is greater than or equal to the threshold signal, then the image data for that particular pixel is deemed moving, and the multiplexer 201 conducts new image data to the frame memory 103 to be stored and displayed.

The multiplexer 201 selects either: the frame integrated result (for non-moving objects) or new non-integrated data (for moving objects) for input into the frame memory and display. The result of this noise suppression system is that frame integration is performed only on stationary scene pixels; and integration is inhibited for pixels which process image data depicting moving objects.

The linear recursive filter 205 on the comparator output is useful for smoothing the difference information. The threshold level can be reduced with this technique and thus the decision of whether to integrate is made more often on scene changing information rather than noise plus scene changing. Noise characteristics determine whether this filtering is desireable.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An image noise suppression system which receives and conducts image data from a signal source to a display, said image noise suppression system comprising:
   - a discriminating means which receives said image data from said signal source and produces a discriminating signal indicating when said image data depicts moving objects for pixels and said discriminating signal indicating when said image data depicts stationary objects for pixels;
   - a memory means which receives, stores and outputs noise suppressed image data;
   - a means for frame integration which receives said image data from said signal source, and noise suppressed image data from said memory means, said integration means outputting a frame integrated signal comprised of one half of said image data plus one half of said noise suppressed image data from said memory means; and
   - a multiplexer which outputs noise suppressed image data to said memory means and said display by receiving said discriminating signal from said discriminating means and conducting said frame integrated signal from said integration means to said display and said memory means when said discriminating signal indicates said image data depicts stationary objects for pixels, said multiplexer conducting said image data directly to said display and said memory means when said discriminating signal indicates that said image data is depicting moving objects for pixels.

2. An image noise suppression system, as defined in claim 1 wherein said discriminating means comprises:
   a subtracting means which produces a difference signal by receiving and subtracting said noise suppressed image data received from said memory means, from said image data received from said signal source;
   an absolute value unit which receives said difference signal from said subtracting means and produces an absolute value of said difference signal;
   a signal generator which produces a threshold signal, said threshold signal having an amplitude value approximately equalling that of expected image noise; and
   a comparator which outputs said discriminating signal by receiving and comparing said threshold signal received from said signal generator with the absolute value of said difference signal received from said absolute value unit, said discriminating signal indicating that the image data processed for a particular pixel is non-moving by indicating when the absolute value of the difference signal is less than the threshold signal.

3. An image suppression system, as defined in claim 2, wherein said integration means comprises:
   a first multiplier which produces a first multiplied signal by receiving and multiplying said image data from said signal source by a first coefficient, said first coefficient being given by $1/1+Y$, where Y equals a number of frame being integrated;
   a second multiplier which produces a second multiplied signal by receiving and multiplying said noise suppressed data from said memory means by a second coefficient, said second coefficient being given by one minus said first coefficient; and
   a summing means which produces said frame integrated signal by receiving and summing said first and second multiplied signals from said first and second multipliers.

4. An image noise suppression system, as defined in claim 3, wherein said memory means comprises a single frame memory, and said first coefficient has a value of one half.

5. An image noise suppression system, as defined in claim 4, including a linear recursive filter which receives and smoothes the absolute value of the difference signal which is used by said comparator, said linear recursive filter providing a smoothed absolute value signal for use by said comparator in place of the absolute value of the difference signal, said linear recursive filter thereby allowing a reduction in the amplitude value of the threshold signal produced by said signal generator.

6. An image noise suppression technique for providing noise smoothing of image data produced by a signal source for a display, said noise suppression technique comprising the steps of:
   sensing image motion within all pixels of the image data produced by the signal source, said sensing step being performed by producing a difference signal which indicates a difference between said frame integrated image signal and said image data, generating a threshold signal which has an amplitude equalling that of expected image noise, then comparing said threshold signal with said difference signal to produce a discriminating signal which indicates the image data for a particular pixel has image motion when said difference signal is greater than the threshold signal, said discriminating signal indicating said image data is non-moving otherwise; and
   enabling frame integration on only stationary scene pixels while conducting image data in an unprocessed condition to the display on pixels having image motion, said enabling step thereby allowing image noise suppression by averaging pixels over time instead of space without resulting in a smear of objects with image motion, said enabling step including performing indiscriminate noise smoothing by frame integrally all image data produced by said signal source, thereby producing a frame integrated image signal; and conducting said image data in an unprocessed condition to said display for pixels for having image motion, and conducting said frame integrated image signal to said display otherwise.

* * * * *